United States Patent [19]

Howe

[11] 4,349,901
[45] Sep. 14, 1982

[54] APPARATUS AND METHOD FOR READING OPTICAL DISCS

[75] Inventor: Dennis G. Howe, Fairport, N.Y.

[73] Assignee: Eastman Kodak Company, Rochester, N.Y.

[21] Appl. No.: 161,486

[22] Filed: Jun. 20, 1980

[51] Int. Cl.³ .............................................. G11B 7/00
[52] U.S. Cl. ..................... 369/45; 356/354; 369/46; 369/109; 369/116
[58] Field of Search .............. 369/44, 45, 46, 109, 369/111, 116, 117, 118, 119, 275; 365/124; 356/354–356

[56] References Cited

U.S. PATENT DOCUMENTS

| | | | |
|---|---|---|---|
| 3,838,401 | 9/1974 | Graf et al. | 369/109 X |
| 3,919,465 | 11/1975 | Adler et al. | 369/109 X |
| 3,956,582 | 5/1976 | Bouwhuis | 369/109 |
| 4,006,293 | 2/1977 | Bouwhuis et al. | 369/45 |
| 4,010,317 | 3/1977 | Bouwhuis | 369/45 |
| 4,065,786 | 12/1977 | Stewart | 369/46 |
| 4,171,879 | 10/1979 | Bricot et al. | 369/109 X |

Primary Examiner—Bernard Konick
Assistant Examiner—Donald McElheny, Jr.
Attorney, Agent, or Firm—John D. Husser

[57] ABSTRACT

Apparatus and method for reading optical discs containing information in the form of tracks of high-spacial-frequency, phase-modulating marks (e.g., depressions or pits) includes means for directing the zero and one first diffraction order of read light returned from the scanned track into superimposed relation on a photodetector and means for predeterminedly masking a portion of the zero diffraction order light so that its magnitude is more equal to that of the first diffraction order light.

8 Claims, 15 Drawing Figures

APPARATUS AND METHOD FOR READING OPTICAL DISCS

BACKGROUND OF THE INVENTION

1. Field of the Invention

The present invention relates to apparatus and methods for photo-electrically detecting (i.e., reading) high density information from optical storage media such as optical discs, and more specifically to such apparatus and methods particularly adapted to detect phase differences imparted to reading light by recorded tracks on the storage media.

2. Description of the Prior Art

One currently preferred approach to high density optical information storage is to record tracks of minute (usually on the order of a micron or less in size) marks on the storage medium. The most popular format is for such storage medium to be of disc shape and for the tracks to be spiral or concentric so that optical scanning can be effected by rotating the disc relative to a small focused spot of read-light (e.g., from a laser). However, there are various other equivalent formats to disc shape and reference herein to optical discs is intended to include all such equivalent optical storage medium.

In general, there are two kinds of systems for storing and retrieving information on optical discs, distinguished primarily by the construction of the recording medium. These can be termed amplitude systems (wherein a read signal is obtained primarily from the difference in amplitude of read light reflected from marked and non-marked portions of the optical disc) and phase systems (wherein a read signal is obtained primarily from the difference in phase of light reflected from marked and non-marked portions of the optical disc). Although the present invention can be utilized with advantage in reading both amplitude and phase systems, it is particularly useful for reading optical discs of the phase system kind. The record tracks of this kind of optical disc are usually comprised of discrete pits or indentations of predetermined depth below the intervening non-pitted track portions. Land portions, of height equal to the non-pitted track portions are located between adjacent tracks to prevent cross-talk. Heretofore, read-out of phase system optical discs has most commonly been practiced by one of two approaches, which can be termed "central aperture" and "split-detector".

In central aperture reading of optical discs, a reading spot, of effective width greater than the track width, is located in a centered relation along a track so that pitted and non-pitted portions of the track scan therepast at a rate determined by the disc rotation speed. The photoelectric detector is located in the center (i.e., on the axis) of the light beam reflected from the scanned disc and receives all such reflected light that is collected by the read-out objective (e.g., by focusing such collected light onto the detector). The pitted portions of the track are of a predetermined optical depth ($\lambda/4$ with respect to the reading light wavelength $\pi$) so that a $\lambda/2$ or $\pi$ phase difference will be imparted to light rays respectively reflected from pitted and non-pitted regions. The peak-to-peak detector signal for the central aperture system is obtained between a maximum constructive interference condition (when light passing to the photodetector is maximally from non-pitted track portions and adjacent lands) and the maximum destructive interference condition (when light passing to the photodetector contains its largest proportion of light from pitted portions that destructively interferes with light from adjacent lands). This technique is described in more detail in an article entitled The Optical Scanning System of the Philips "VLP" Record Player, at pages 186-189 of Volume 33 of the Philips Technical Review, No. 7, 1973.

One example of the "split-detection" approach for reading phase difference information from optical discs is disclosed in U.S. Pat. No. 4,065,786. That patent indicates an objective to utilize a read-spot of lesser cross track dimension (width) than the central aperture approach, so as to minimize the likelihood of cross-talk between adjacent information tracks. In order to utilize such a reduced read-spot width and still maintain the high resolution obtainable with the central aperture detection, the patent suggests that two light detectors be located in a non-centered position with respect to the central axis of the light beam returned from the interrogated track on the disc. Specifically, the light detectors are located respectively to respond to the light intensity in two overlap zones of the light retroreflected from the disc, viz., the overlaps of the zero diffraction order beams returned from the disc with each of the + and − first diffraction order beams returned from the disc. The outputs of the two light detectors are combined (subtracted) to double the amplitude of the recovered signal.

Besides reducing the likelihood of cross-talk, the split detection approach provides an additional potential advantage over the central aperture detection approach. Specifically, split detection provides a maximum signal when the phase of light reflected from pitted and non-pitted portions of the disc differs by $\pi/2$, rather than $\pi$ as in central aperture detection. Thus, in systems in which phase shift depends on pit depth, optical depths of only $\lambda/8$ can be used with split detection (in contrast to the $\lambda/4$ optical pit depths that optimize central aperture detection); and the use of "shallower" pits can be very advantageous for real-time recording approaches where desired pit depth dictates the laser recording power and/or speed of operation.

However, split detection is not without disadvantages. As mentioned, that approach requires precise placement of two detectors with respect to the two overlap zones between zero and first diffraction order light beams. In addition, the detector must be placed in a plane in space in which such overlap zones are accessible, e.g., at a plane that is image conjugate to the exit pupil of the read-out objective, and only light in the overlap regions contributes to the signal recovered from the disc. In general, the amplitudes of the interfering zero and first order beams are not equal in the regions where these beams overlap; and the depth of modulation of the signal resulting from the mutual interference of those beams is limited by this fact. Moreover, since the signal generated by the zero/plus first order overlap is 180° out of phase with that generated by the zero/minus first order overlap, two detectors must be used to obtain maximum signal depth of modulation; and these detectors cannot be at the focus of a field lens. This situation complicates system alignement.

SUMMARY OF THE INVENTION

The present invention pertains to apparatus and methods for improved detection of information from optical discs. It is one advantage of the present invention that simplified structures can be utilized to detect high density, television-type, video information, comprised of pits that provide $\pi/2$ or smaller phase shifts relative to the unrecorded portions of the disc, with improved peak-to-peak signals.

In general, these advantages are obtained in accordance with the present invention by scanning a reading light spot with respect to tracks of an optical disc having information recorded thereon as high spacial frequency, light amplitude and/or phase-modulating patterns; directing the zero diffraction order beam and one of the first diffraction order beams that are diffracted from the tracks into superimposed relation on a photodetector, and masking a predetermined portion of such zero diffraction order beam so that its magnitude at the photodetector is more equal to the magnitude of the first diffraction order light at the photodetector thereby enhancing the depth of modulation (contrast) of any interference that can occur between such light beams.

In another aspect, the present invention comprises (a) first means for directing a beam of coherent read light into a focus as a read spot on tracks of such an optical disc; (b) means for scanning the read spot along the tracks by providing relative movement between such optical disc and the spot focused by said light directing means; (c) photodetector means spaced from such optical disc; (d) second means for directing the zero diffraction order of read light reflected from the tracks and one first diffraction order of read light reflected from the tracks into superimposing relation on the photodetector means; and (e) means located between the optical disc and the photodetector means for masking a portion of such zero diffraction order of light passing toward the photodetector means.

BRIEF DESCRIPTION OF THE DRAWINGS

The foregoing and other advantages of the present invention will be understood further from the subsequent description of preferred embodiments of the invention which is made with reference to the attached drawings wherein.

DETAILED DESCRIPTION OF THE PREFERRED EMBODIMENTS

Figure 1:
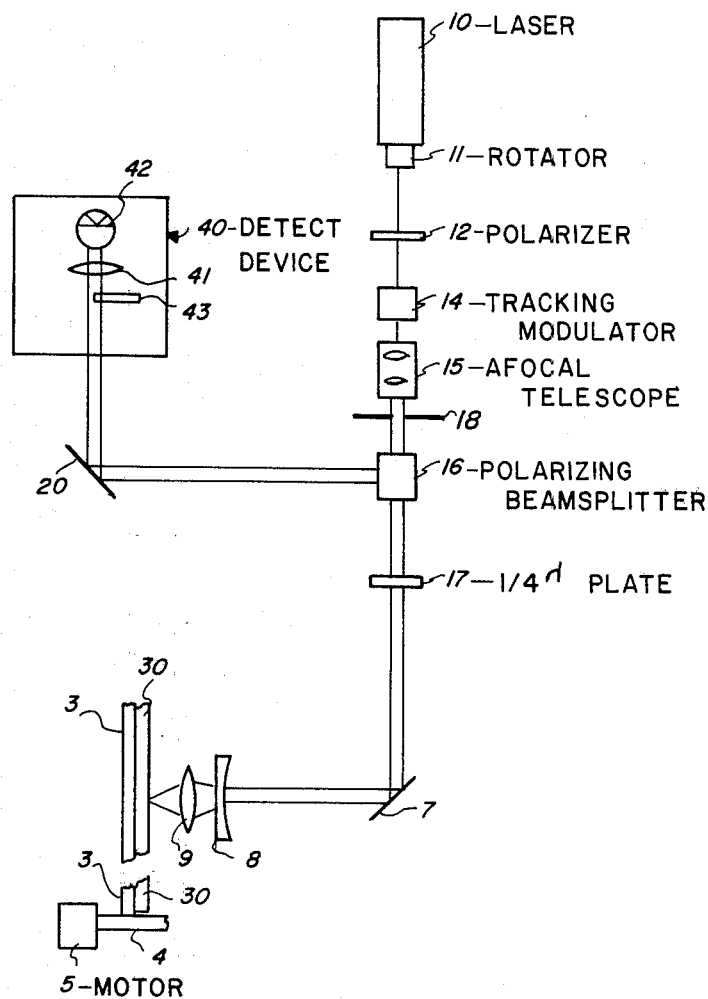
FIG. 1 is a schematic view of one embodiment of optical disc reading apparatus in which the present invention is useful.

Referring first to FIG. 1, there is illustrated one preferred apparatus embodiment for reading information from optical discs in accord with the present invention. That disc reading apparatus comprises a reading laser 10 which directs coherent light of a predetermined reading wavelength sequentially through polarizing rotator 11, polarizer 12, tracking modulator 14, a focal telescope 15, adjustable iris diaphragm 18, polarizing beamsplitter 16, one-quarter wave plate 17 and mirror 7, to a negative correction lens 8 and focusing objective 9. These elements are conventional and the focusing objective 9 can be, e.g., an objective such as a Nikon Achromat NA 0.65 microscope objective.

Light from the objective 9 is focused as a read-spot onto a track of optical disc 30, which is supported on a turntable 3 for rotation about shaft 4 by motor 5. The read light relected from tracks of disc 30 is then directed back through lens elements 9 and 8 and plate 17 to polarizing beamsplitter 16, where it is directed to mirror 20 and toward the detection device 40 which will be described in more detail below.

Figure 2:
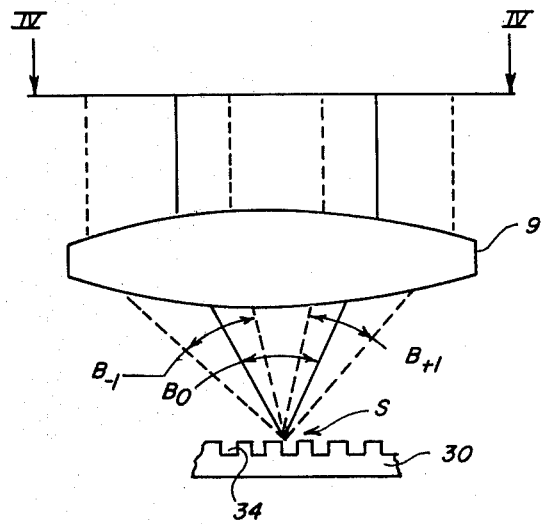
FIG. 2 is an enlarged schematic view of the portion of the FIG. 1 apparatus wherein read light is focused on the optical disc.

Before proceeding to a description of the structure and mode of operation for signal detection system 40, some general explanation of the interaction of the read light spot S and the optical disc 30 will be helpful. As shown in FIG. 2, the optical disc has tracks of intermittent pitted and non-pitted portions. Discs having such tracks can be formed as replicates by pressing from masters, by ablation or deformation of a recording layer by a recording laser or by exposing and developing a photoresist layer. One preferred disc structure for use with the present invention is described in U.S. Application Ser. No. 124,381, entitled "Physically Optimized Optical Disc Structure, Method and Apparatus", and filed Feb. 25, 1980 in the names of Howe and Wrobel. This preferred disc structure provides pits which impart phase shifts of approximately $\pi/2$ to read spot light reflected from the recorded disc.

To the read-out light such a disc is basically a phase object with elongated indentations (pits) 34 laid out along circular or spiral tracks on a surface of approximately uniform amplitude reflectance. The read-spot S focused on the recorded surface should be somewhat larger than the length (along the track) of the recorded pits so that the read light returned from the disc will be broken into different diffraction orders, viz., the zero and − and + first diffraction orders indicated as beams $B_o$, $B_{-1}$ and $B_{+1}$ in FIG. 2.

Referring now to FIGS. 3A–3D, the movement of the disc through different positions within a period of the recorded pattern's spacial frequency (i.e., movement along the recorded track between similar portions of adjacent pits) is illustrated in stages. The beams of light $B_o$, $B_{-1}$ and $B_{+1}$ are illustrated by vectors $I_o$, $I_{-1}$ and $I_{+1}$ which represent their general relative direction and magnitude. In those Figures the dotted lines represent the position of the incoming read-spot on the moving disc and it can be seen that for a given spacial frequency (i.e., pit-to-pit spacing) the directions and relative intensity (or amplitudes) of the beams remain generally the same. The difference in intensity between the zero and first diffraction order beams will depend on the optical pit depth and the ratio of recorded pit length to pit spacing but in the case under consideration (where the focused playback spot of light is somewhat larger than the recorded pit), the zero diffraction order will in general have greater magnitude. While the relative direction of the zero and first diffraction order beams remain generally the same, the relative phase of the zero order and ± first diffraction order beam will vary through ±2π radians as the read-spot scans through one period of the recorded pattern's spacial frequency (i.e., from the center of one recorded pit to the center of its adjacent neighbor along the track). Although the relative phase of the first diffraction order beams vary (rotate) in opposite directions, it is important to note that once during each period each first diffraction order beam will be: (1) exactly in phase with the zero diffraction order beam and (2) 180° out of phase with the zero diffraction order beam.

Figure 4:
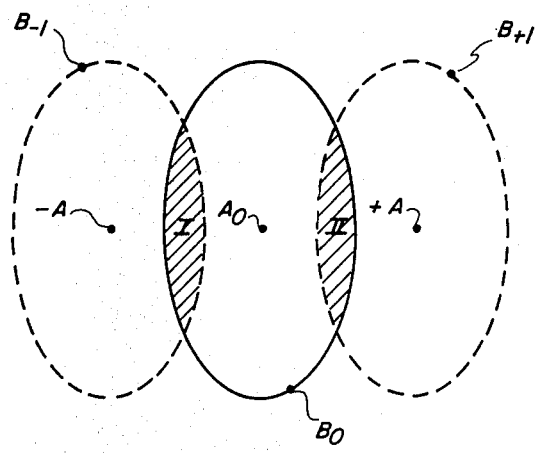
FIG. 4 is a diagram indicating the light distribution in a plane along IV—IV in FIG. 2.
Figure 3A:
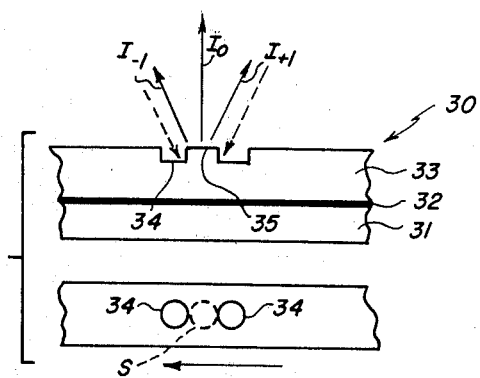
FIGS. 3A–3D are diagrams indicating the diffraction of the focused read light as the optical disc scans past the read-spot of FIG. 2.
Figure 3B:
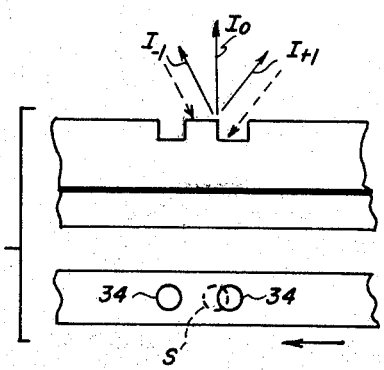
Figure 3C:
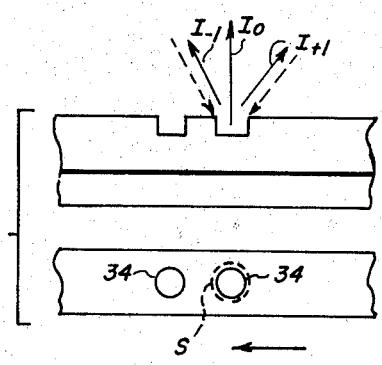
Figure 3D:
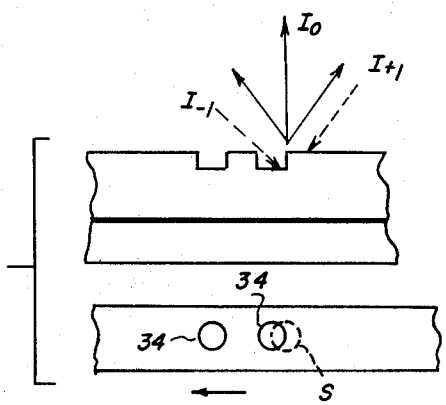

Referring to FIG. 4, the beams of light $B_o$, $B_{-1}$ and $B_{+1}$ are shown after passing back through lens 9, as they would intersect a plane such as IV—IV in FIG. 2 which is not image conjugate to the disc surface. The central axes or principal rays $A_o$, $-A$ and $+A$ of the zero and first order beams are separated by a distance that is inversely proportional to the recorded pit spacing.

Figure 5:
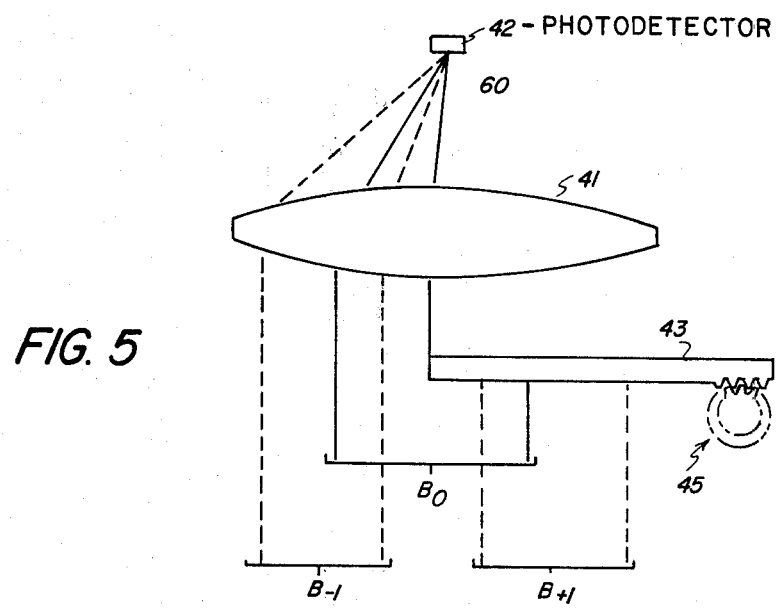
FIG. 5 is a schematic view illustrating one embodiment for photodetection in accordance with the present invention.

Referring to FIG. 5, in accordance with the present invention, the detecting lens 41 is located to receive that portion of light beams $B_o$, $B_{-1}$ and $B_{+1}$ which pass mask 43 and direct them into a superimposed relation on photodetector 42. More specifically, I have found that by selectively masking (i.e., blocking from passage to the photodetector 42) a portion of the light in the zero diffraction order beam, an enhanced pit detection signal can be obtained. An embodiment that is especially useful for π/2 phase shift recorded pits is illustrated schematically in FIG. 5 wherein mask 43 is positioned to mask the $B_{+1}$ order beam and a portion of the $B_o$ order beam. The reason this leads to an enhanced signal can perhaps best be explained by referring again to FIGS. 3A-3D wherein it can be noted that the magnitude $I_o$ of beam $B_o$ is always greater than the magnitude $I_{-1}$ or beam $B_{-1}$. By selectively decreasing the total light in beam $B_o$, to balance the total amount of light in beam $B_{-1}$ and superimposing the beam $B_{-1}$ and apodized beam $B_o$ (via focusing them to a common point with lens 41), the contrast or depth of modulating of the periodic destructive interference condition that will occur between the zero and $-1$ order beams is maximized.

Figure 6:
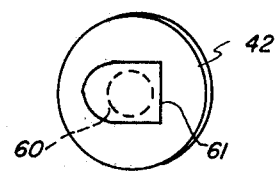
FIG. 6 is an enlarged view of the photodetector shown in FIG. 5.

Because of the focusing action of lens 41, the modulated light which is detected by photodetector 42 is not limited to only that in an overlapping region between the zero and first diffraction order beams, e.g., the light in region I in FIG. 4. Thus, as can be seen in FIGS. 5 and 6, detector lens 41 forms a spot 60 formed of the entire beam $B_{-1}$, superimposed with the spot 61 formed of the transmitted portion of light from beam $B_o$. Such substantially superimposed relation facilitates enhanced read-out in accord with the present invention.

Figure 10A:
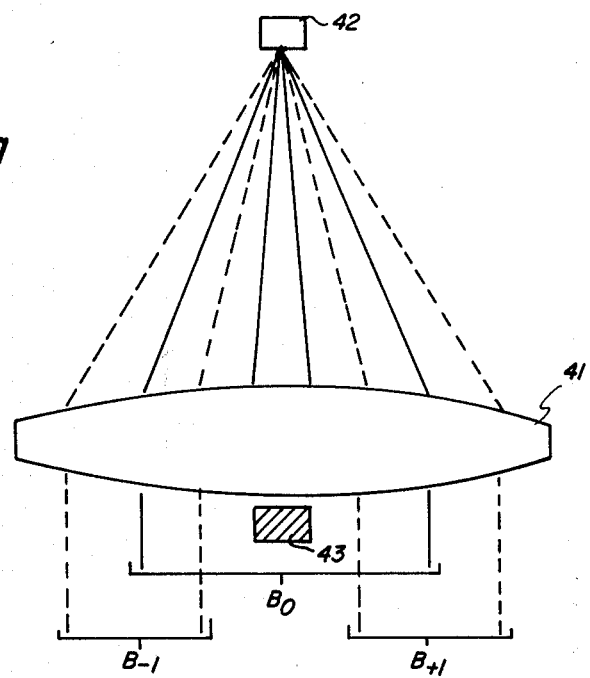
FIGS. 10-A, 10-B and 11 are diagrams illustrating alternative embodiments of the present invention.
Figure 10B:
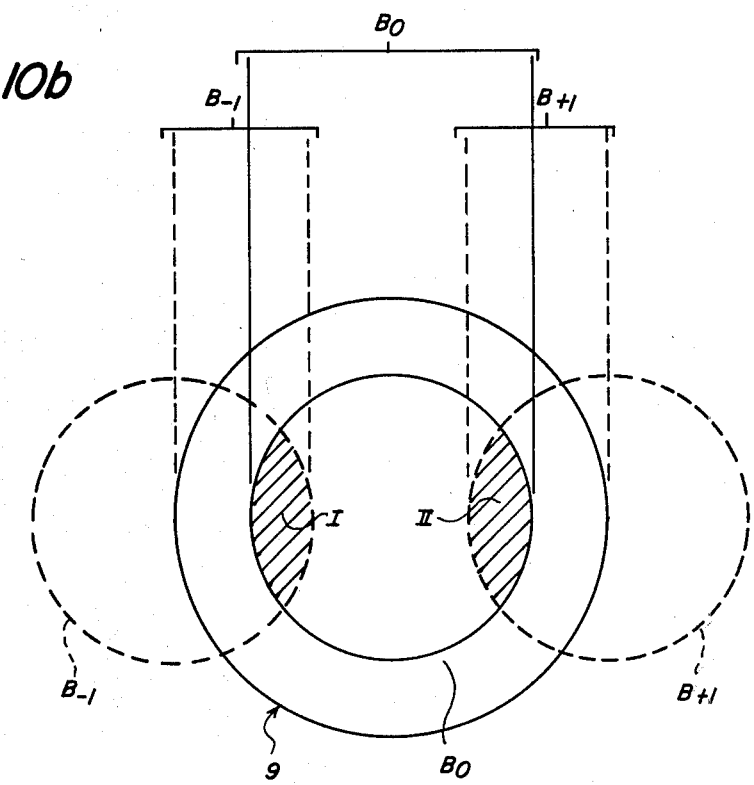

The FIG. 5 diagram shows an optical arrangement wherein the numerical aperture of the read-out objective 9 (FIG. 2) is sufficiently large so as not to truncate the $B_{-1}$ beam. If that beam is truncated by the lens 9 (e.g., as shown in FIG. 10-B) the distance which the mask 43 will be moved into the $B_o$ beam will be increased since the total light in the beam $B_{-1}$ will have been decreased by the lens 9 truncation. In most interesting applications (those demanding high packing densities) the recorded pit frequencies will be sufficiently high that some such truncation of the first diffraction order beam, by the read-out lens, will occur. In these instances the mismatch in the total light in beams $B_o$ and $B_{-1}$ would be further aggravated and the benefit of apodizing the zero order beam with mask 43 is even greater. Thus the zero order beam should be predeterminedly masked so that the amplitude of non-masked zero diffraction order light falling on the photodetector is generally equal to the mean amplitude of one first diffraction order light falling on the photodetector over the operative spacial frequency bandwidth of the optical disc being read.

One useful mode of accomplishing such predetermined masking of the zero diffraction order beam (i.e., balancing its magnitude with one first diffraction order beam) is by a member 43, which can be a knife blade or other appropriate construction for movement in the light path by adjusting means 45 which could be a rack-and-pinion arrangement. With this arrangement and the reading beam directed at a rotating disc as shown in FIG. 1, the mask 43 can be moved within the path by adjusting means 45 until the peak-to-peak value of the signal current from photodetector 42 is maximum. When operating in this manner with optical discs of the type described in the aforementioned U.S. Application Ser. No. 124,381, 30 KHz bandwidth signal-to-noise ratios (for 8 MHz carriers recorded on a disc spinning at 1800 RPM and recovered from such disc) that exceed 70 dB have been obtained.

Figure 7:
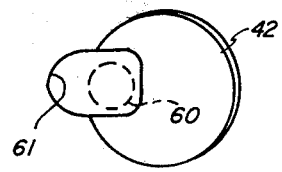
FIGS. 7 and 8 are alternative embodiments of photodetector construction.
Figure 8:
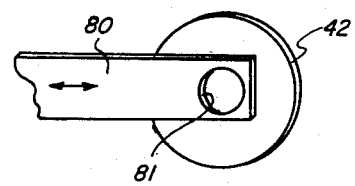

FIG. 7 illustrates an alternative embodiment of the present invention whereby the photodetection of the information signal can be further enhanced. In this embodiment, the photodetector is positioned relative to the focus of detection lens 41 so that a portion of the light from the truncated first order beam does not fall upon it. That is, the masking of the beam $B_o$ causes spot 61 at the detector to be slightly larger than spot 60 and the component of background shot noise created by unmodulated light in the region where 60 and 61 do not overlap can be avoided if the detector is located as shown in FIG. 7. FIG. 8 discloses an alternative configuration for accomplishing the same purpose, i.e., photodetector mask means 80 with an aperture 81 generally of size equal to focused spot 60 of the first diffraction order beam. In embodiments where the read-out objective truncates the first diffraction order light, the FIG. 7 and 8 embodiments may not be worthwhile, because the spots 60 and 61 will be of more equal size.

Figure 9:
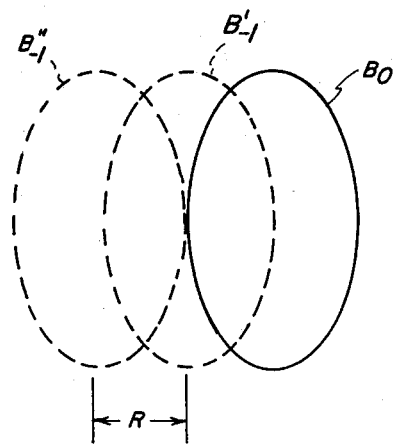
FIG. 9 is a diagram such as FIG. 4 showing relative positions of various diffraction orders when different spacial frequencies are recorded along tracks on the disc.

The size of read-out lens 9 is desirably selected in relation to the spacial frequency bandwidth of the information on the optical disc. This can be understood further by reference to FIG. 9 as well as FIG. 5. Thus, as the spacial frequency of pits decrease, i.e., as the pits become further spaced, the direction of the first order beam $B_{-1}$ shifts toward the zero order beam to the dash-line position shown in FIG. 9 as $B'_{-1}$. As the spacial frequency increases, i.e., as the pits become closer together, the direction of beam $B_{-1}$ shifts in the other direction to the dot-line position indicated as $B''_{-1}$ in FIG. 9. It is preferred that lens 41 accommodate the entire beam $B''_{-1}$ that passes lens 9 i.e., direct the entire portion of collected first diffraction order light to detector 42 at the highest spacial frequencies of the optical disc to be read. Similarly, it is preferred that mask 43 not truncate any portion of the beam $B'_{-1}$ at the lowest spacial frequencies of the optical disc.

Although the present invention is preferred for use in connection with storage media in which π/2 phase differences are imparted to the reflected light, it has certain advantages in connection with media in which π phase differences are imparted. One such application is shown in FIGS. 10-A and 10-B wherein similar parts and light paths bear the same designation as in FIGS. 2, 4 and 5. As shown in FIGS. 10-B, the lens 9 truncates portions of the first order beams $B_{-1}$ and $B_{+1}$ and as shown in FIG. 10-A, the truncated beam portions both are focused into superimposed relation on photodetector 42 with the unmasked (transmitted) portion of zero order beam $B_0$. With $\pi$ phase shift imparted by the recorded regions (pits) to the light reflected from the disc, the overlap regions I and II in FIG. 10-B are simultaneously bright and dark (i.e., at maximum constructive and destructive interference states). A simple central stop 43' is used to match the total transmitted light of beam $B_o$ and the total light in the truncated portions of the beams $B_{-1}$ and $B_{+1}$ that are focused to a point on detector 42.

Figure 11:
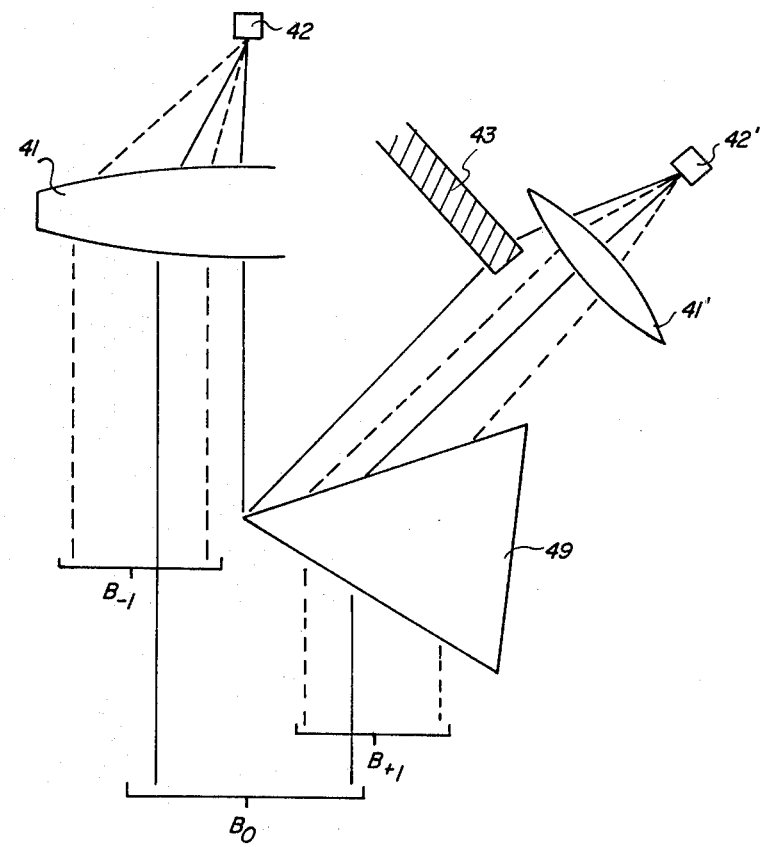

FIG. 11 discloses an alternative preferred embodient for use with storage media providing $\pi/2$ phase shift systems. In that embodiment a prism 49 is used to direct the $B_{+1}$ and a predetermined portion of the beam $B_o$ away from objective 41. Thus the light falling on detector 42 is balanced in accord with the present invention. In a further modification, the zero order light beam $B_o$ from prism 49 can in turn be masked by element 43' so that it is balanced with the beam $B_{+1}$ light directed into superimposition therewith on photodetector 42' by lens 41'. The signals from detectors 42 and 42' are then added after appropriate phase shifting of one relative to the other to provide a further enhanced signal level.

The invention has been described in detail with particular reference to certain preferred embodiments thereof, but it will be understood that variations and modifications can be effected within the spirit and scope of the invention.

What is claimed is:

1. Apparatus for reading optical discs of the type having high density information recorded as tracks of phase-modulating marks of a given operative spacial frequency bandwidth; said apparatus comprising:
   (a) first means for directing a beam of coherent read light into focus as a read-spot on such tracks;
   (b) means for scanning said read spot along said tracks by providing relative movement between such optical disc and said light directing means;
   (c) photodetector means spaced from such optical disc;
   (d) second means for directing the zero diffraction order of read light from the tracks and one first diffraction order of read light from the tracks into substantially superimposed relation on said photodetector means; and
   (e) first masking means constructed and located between the optical disc and said photodetector means for masking a predetermined portion of said zero diffraction order of light passing toward said photodetector means such that the amplitude of non-masked zero diffraction order light falling on said photodetector means is generally equal to the mean amplitude of first diffraction order light falling on said photodetector means over such given operative spacial frequency bandwidth.

2. The invention defined in claim 1 wherein masking means is located between said first and second light directing means at a position nonconjugate to the optical disc.

3. The invention defined in claim 1 wherein said masking means includes a light blocking element movably mounted in the path of said zero diffraction order beam.

4. The invention defined in claim 1 wherein said second light directing means includes a detector lens having an effective aperture sufficient to accommodate a substantial proportion of said first diffraction order beam at the highest spacial frequency of such given operative bandwidth.

5. The invention defined in claim 1 further including second masking means located proximate said photodetector means for blocking from said photodetector portions of said zero diffraction order light not superimposed with respect to said first diffraction order light.

6. The invention defined in claim 1 wherein said photodetector means is positioned so as not to intersect with portions of said zero diffraction light passing said masking means but not superimposed with said first diffraction order light.

7. A method of reading an optical disc of the type having recorded tracks of phase-modulating marks of a given operative spacial frequency bandwidth, said method comprising:
   (a) scanning a focused beam of coherent read light along said tracks;
   (b) directing the zero and one first diffraction order read light that is diffracted from said tracks into substantially superimposed relation on the photodetector; and
   (c) masking a predetermined portion of said zero diffraction order light such that the amplitude of superimposing zero diffraction order light is generally equal to the mean amplitude of superimposing first diffraction order light over such given operative spacial frequency bandwidth.

8. The invention defined in claim 7 further comprising preventing portions of the non-masked zero diffraction order light that are not in superimposed relation with resepct to said first diffraction order light, from reaching said photodetector.

* * * * *